United States Patent
Song et al.

(10) Patent No.: US 11,599,142 B2
(45) Date of Patent: Mar. 7, 2023

(54) TIMING GENERATOR, TIMING GENERATING METHOD, AND ASSOCIATED CONTROL CHIP

(71) Applicant: Realtek Semiconductor Corp., HsinChu (TW)

(72) Inventors: Liangliang Song, Zhangsha (CN); Mingrui Li, Zhangsha (CN); Xiangzhu Yang, Zhangsha (CN); Chun-Kai Wang, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 425 days.

(21) Appl. No.: 16/865,413

(22) Filed: May 3, 2020

(65) Prior Publication Data

US 2021/0124388 A1    Apr. 29, 2021

(30) Foreign Application Priority Data

Oct. 25, 2019 (CN) .......................... 201911025951.3

(51) Int. Cl.
*G06F 1/14* (2006.01)
*G06F 1/06* (2006.01)

(52) U.S. Cl.
CPC . *G06F 1/14* (2013.01); *G06F 1/06* (2013.01)

(58) Field of Classification Search
None
See application file for complete search history.

(56) References Cited

U.S. PATENT DOCUMENTS

| | | | | |
|---|---|---|---|---|
| 4,970,687 A | * | 11/1990 | Usami | G11C 11/416 365/189.16 |
| 5,325,513 A | * | 6/1994 | Tanaka | G06F 13/1694 710/16 |
| 5,488,325 A | * | 1/1996 | Sato | H03K 5/135 327/279 |
| 6,034,907 A | * | 3/2000 | Haraguchi | G11C 29/02 365/201 |
| 6,058,057 A | * | 5/2000 | Ochiai | G06F 1/025 365/194 |
| 6,061,816 A | | 5/2000 | Shimizu | |
| 2001/0056521 A1 | * | 12/2001 | Fujiwara | G11C 29/70 711/167 |
| 2004/0196052 A1 | * | 10/2004 | Okayasu | H03K 5/13 324/617 |

(Continued)

*Primary Examiner* — Phil K Nguyen
(74) *Attorney, Agent, or Firm* — Winston Hsu

(57) ABSTRACT

A timing generator, a timing generating method and an associated control chip are provided, wherein the timing generator includes a receiving circuit, a transmitting circuit coupled to the receiving circuit, and a control unit respectively coupled to the receiving circuit and the transmitting circuit. The receiving circuit may be configured to receive a timing data set from a storage device. The transmitting circuit may be configured to select a specific signal type within multiple signal types according to the timing data set, and output an output signal having the specific signal type with a specific time length, wherein the timing data set indicates the specific signal type and the specific time length. The control unit may be configured to control operations of the receiving circuit and the transmitting circuit.

17 Claims, 5 Drawing Sheets

(56) References Cited

U.S. PATENT DOCUMENTS

| | | | | |
|---|---|---|---|---|
| 2006/0056269 A1* | 3/2006 | Chiba | ............. | G01R 31/31922 |
| | | | | 365/201 |
| 2007/0247958 A1* | 10/2007 | Lee | ......................... | G11C 7/22 |
| | | | | 365/230.06 |
| 2009/0132884 A1* | 5/2009 | Suda | ................ | G01R 31/31922 |
| | | | | 714/744 |
| 2013/0265835 A1* | 10/2013 | Lee | ....................... | G11C 7/109 |
| | | | | 365/193 |
| 2019/0355408 A1* | 11/2019 | Shin | .................... | G11C 11/4094 |

\* cited by examiner

TIMING GENERATOR, TIMING GENERATING METHOD, AND ASSOCIATED CONTROL CHIP

BACKGROUND OF THE INVENTION

1. Field of the Invention

The present invention is related to the generation of timing signals, and more particularly, to a timing generator, a timing generating method and a control chip, which can generate arbitrary digital signal waveforms.

2. Description of the Prior Art

There are many methods for generating digital signal waveforms: for example, by controlling general-purpose input/output (GPIO) or by utilizing a universal asynchronous receiver/transmitter (UART). These methods have certain disadvantages, however. For example, the UART is limited to the precision of the related hardware, and is therefore unable to reach nanosecond level precision. In addition, if high precision is required, states need to be continuously switched through a certain type of loop (e.g. a specific command such as while loop) under a condition of disabling interruption, which may greatly occupy computational resources of a central processing unit (CPU). In another example, utilizing the UART also introduces the problem of occupying the computational resources of the CPU. In addition, due to characteristics of the UART, the UART cannot generate arbitrary digital signal waveforms.

Thus, there is a need for a novel timing generator and timing generating method which can solve the problems of the related art without introducing any side effect or in a way that is less likely to introduce side effects.

SUMMARY OF THE INVENTION

An objective of the present invention is to provide a timing generator, a timing generating method and a control chip, to generate arbitrary digital signal waveforms without greatly occupying computational resources.

At least one embodiment of the present invention provides a timing generator, wherein the timing generator comprises a receiving circuit, a transmitting circuit coupled to the receiving circuit, and a control unit respectively coupled to the receiving circuit and the transmitting circuit. The receiving circuit may be configured to receive one or more timing data sets from a storage device. The transmitting circuit may be configured to select a specific signal type within multiple signal types according to a timing data set within the one or more timing data sets, and output an output signal having the specific signal type with a specific time length, wherein the timing data set indicates the specific signal type and the specific time length. The control unit may be configured to control operations of the receiving circuit and the transmitting circuit.

At least one embodiment of the present invention provides a timing generating method. The timing generating method comprises: utilizing a receiving circuit to receive one or more timing data sets from a storage device; and utilizing a transmitting circuit to select a specific signal type within multiple signal types according to a timing data set within the one or more timing data sets, and output an output signal having the specific signal type with a specific time length, wherein the timing data set indicates the specific signal type and the specific time length. In addition, operations of the receiving circuit and the transmitting circuit are controlled by a control unit.

At least one embodiment of the present invention provides a control chip, wherein the control chip comprises a storage device, a timing generator coupled to the storage device, and a processing circuit coupled to the timing generator. More particularly, the timing generator comprises a receiving circuit, a transmitting circuit coupled to the receiving circuit, and a control unit respectively coupled to the receiving circuit and the transmitting circuit. In operations of the control chip, the storage device may be configured to store one or more timing data sets (e.g. a series of timing data sets), and the processing circuit may be configured to transmit at least one command to the control unit to control operations of the timing generator. In the operations of the timing generator, the receiving circuit may be configured to receive the one or more timing data sets from the storage device. The transmitting circuit may be configured to select a specific signal type within multiple signal types according to a timing data set within the one or more timing data sets, and output an output signal having the specific signal type with a specific time length, wherein the timing data set indicates the specific signal type and the specific time length. The control unit may be configured to control operations of the receiving circuit and the transmitting circuit.

The present invention can read one or more timing data sets (e.g. a series of timing data sets) from a storage device, and further generate a corresponding digital signal according to a timing data set within the one or more timing data sets. As the digital signal can be generated based on the timing data set that is able to be arbitrarily edited, the present invention can generate arbitrary digital signal waveforms by modifying the timing data set without greatly occupying computational resources of a central processing unit (CPU).

These and other objectives of the present invention will no doubt become obvious to those of ordinary skill in the art after reading the following detailed description of the preferred embodiment that is illustrated in the various figures and drawings.

DETAILED DESCRIPTION

Figure 1:
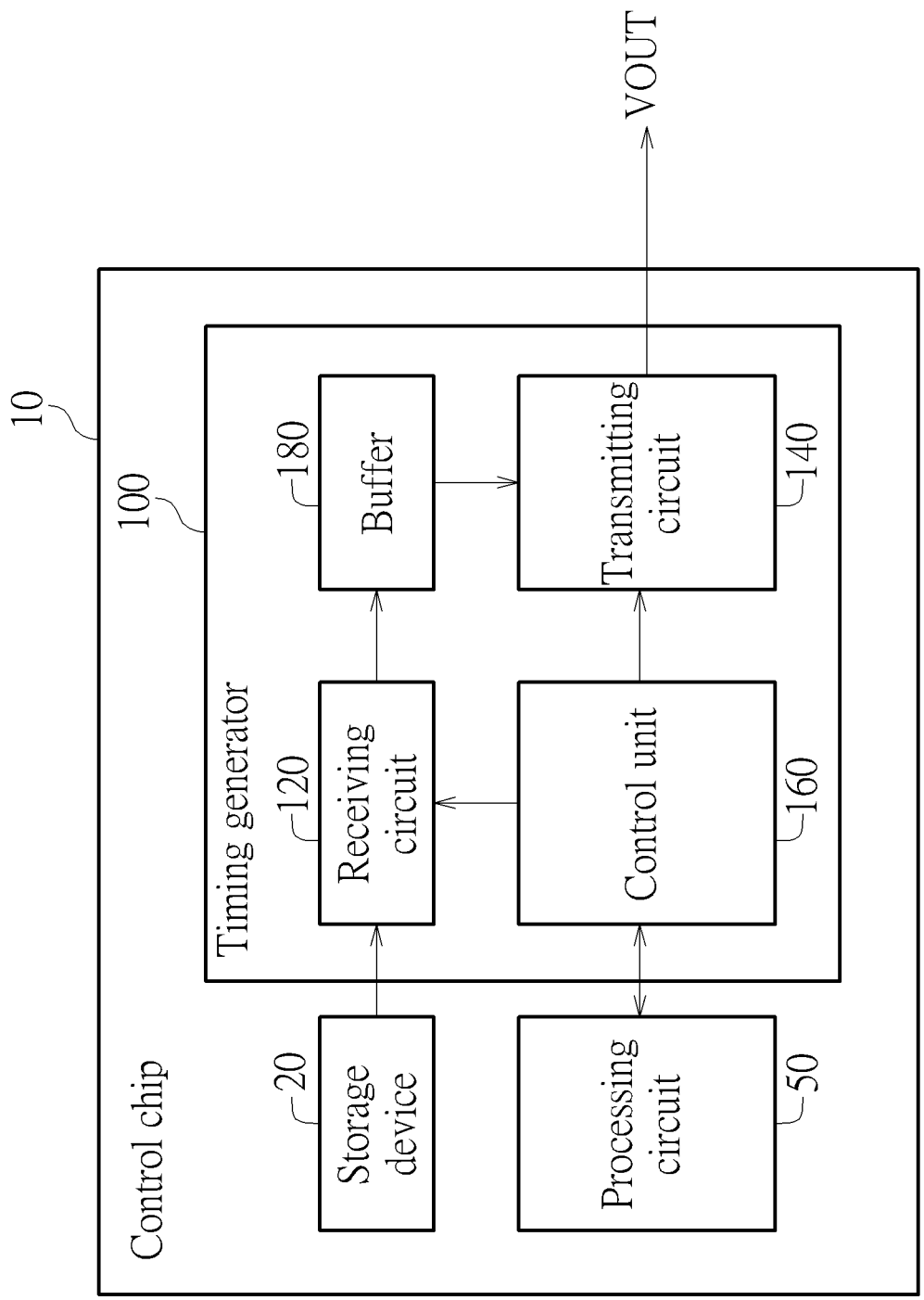
FIG. 1 is a diagram illustrating a control chip according to an embodiment of the present invention.

FIG. 1 is a diagram illustrating a control chip 10 according to an embodiment of the present invention. The control chip 10 may comprise a storage device 20, a timing generator 100 coupled to the storage device 20, and a processing circuit 50 coupled to the timing generator 100, where the storage device 20 may be implemented by a Synchronous Dynamic Random Access Memory (SDRAM) utilizing a Double Data Rate (DDR) technology, and the processing circuit 50 may be implemented by a central processing unit (CPU), but the present invention is not limited thereto. In this embodiment, the timing generator 100 may comprise a receiving circuit 120, a transmitting circuit 140 coupled to the receiving circuit 120, and a control unit 160 respectively coupled to the receiving circuit 120 and the transmitting circuit 140. In addition, the timing generator 100 may further comprise a buffer 180 coupled between the receiving circuit 120 and the transmitting circuit 140 (e.g. the transmitting circuit 140 is coupled to the receiving circuit 120 through the buffer 180) to buffer data transmitted from the receiving circuit 120 to the transmitting circuit 140, where the buffer 180 may comprise a first input first output (FIFO) memory, but the present invention is not limited thereto.

In operations of the control chip 10, the storage device 20 may be configured to store one or more timing data sets (e.g. a series of timing data sets), and the processing circuit 50 may be configured to transmit at least one command to the control unit 160 to control operations of the timing generator 100. In the operations of the timing generator 100, the receiving circuit 120 may be configured to receive the one or more timing data sets (e.g. the series of timing data sets) from the storage device 20; for example, the buffer 180 may receive the series of timing data sets from the receiving circuit 120, and sequentially transmit each timing data set within the series of timing data sets to the transmitting circuit 140. The transmitting circuit 140 may be configured to select a specific signal type within multiple signal types according to a timing data set (e.g. each timing data set within the series of timing data sets) within the one or more timing data sets (e.g. the series of timing data sets), and output an output signal VOUT having the specific signal type with a specific time length, wherein the timing data set indicates the specific signal type and the specific time length. The control unit 160 may be configured to control operations of the receiving circuit 120 and the transmitting circuit 140.

In this embodiment, the multiple signal types may at least comprise one or more of pulse width modulation (PWM), a first fixed level, and a second fixed level different from the first fixed level. In addition, the control unit 160 may control settings such as a frequency and a duty cycle of the PWM according to commands transmitted by the processing circuit 50, where the frequency and the duty cycle of the PWM may carry information or may be determined according to some design requirements.

Figure 2:
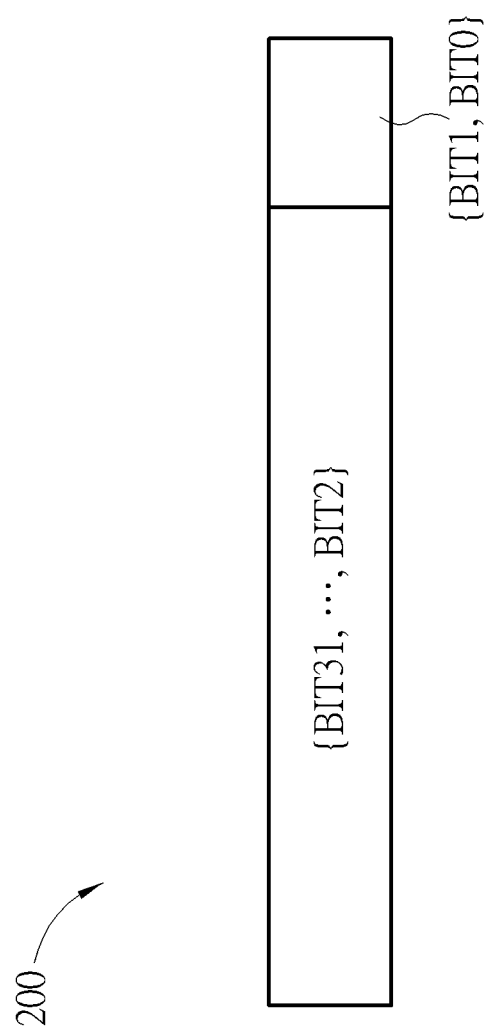
FIG. 2 is a diagram illustrating a timing data set according to an embodiment of the present invention.

FIG. 2 is a diagram illustrating a timing data set 200 according to an embodiment of the present invention, where the timing data set 200 may be an example of the timing data set, and the timing data set 200 may be formed by 32 bits of data such as data {BIT31, ..., BIT2, BIT1, BIT0}, but the present invention is not limited thereto. In this embodiment, the timing data set 200 may comprise first partial data (e.g. data {BIT1, BIT0}) and second partial data (e.g. data {BIT31, ..., BIT2}), and the first partial data and the second partial data respectively correspond to the specific signal type and the specific time length.

Figure 3:
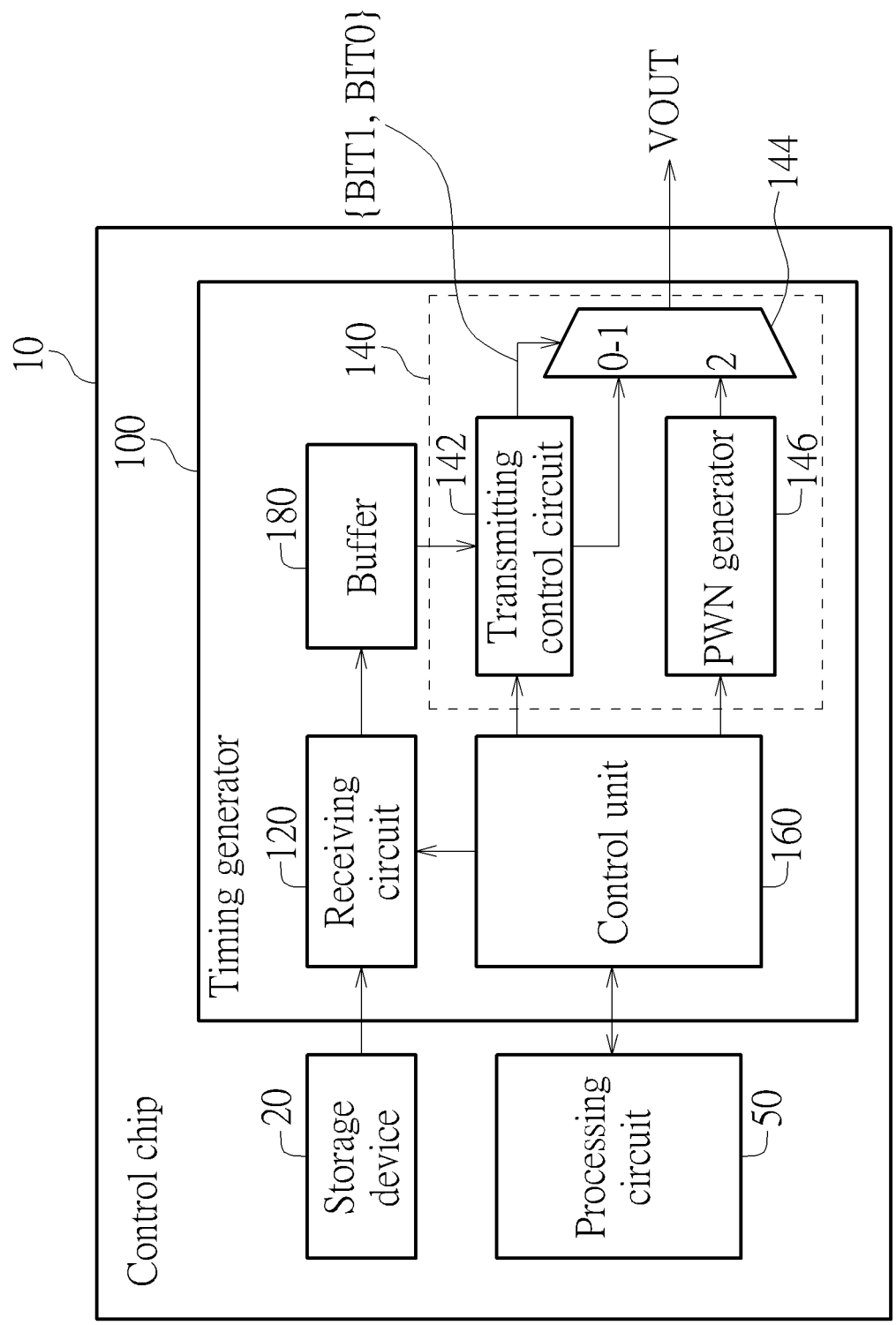
FIG. 3 illustrates some implementation details of the control chip shown in FIG. 1 according to an embodiment of the present invention.

FIG. 3 illustrates some implementation details of the control chip according to an embodiment of the present invention. In this embodiment, the transmitting circuit 140 may comprise multiple signal sources, a transmitting control circuit 142 coupled to the multiple signal sources, and a selecting circuit 144 (e.g. a multiplexer) coupled to the transmitting control circuit 142. The multiple signal sources may be configured to generate multiple signals having the multiple signal types, respectively, e.g. a PWN generator 146 for generating PWM signals, a signal source (not shown) for generating signals having the first fixed level such as a voltage level VH, and a signal source (not shown) for generating signals having the second fixed level such as a voltage level VL. The transmitting control circuit 142 may be configured to output at least one of the multiple signals with the specific time length (e.g. generating a signal having a corresponding signal time length according to the data {BIT31, BIT2} within the timing data set 200 shown in FIG. 2), and the selecting circuit 144 may be configured to select the specific signal type within the multiple signal types according to the timing data set; e.g. by determining which signal source is utilized to output the signal to be outputted according to the data {BIT1, BIT0} within the timing data set 200 shown in FIG. 2.

In this embodiment, when the data {BIT1, BIT0} is {0, 0} (which may represent a value 0), the selecting circuit 144 may output the signal having the voltage level VL; when the data {BIT1, BIT0} is {0, 1} (which may represent a value 1), the selecting circuit 144 may output the signal having the voltage level VH; and when the data {BIT1, BIT0} is {1, 0} (which may represent a value 2), the selecting circuit 144 may output the signal generated by the PWM generator 146. It should be noted that the implementation of the transmitting circuit 140 is not limited to the architecture shown in FIG. 3; any circuit architecture capable of outputting a signal having a specific time length and a specific signal type according to the timing data set obtained from the buffer 180 belongs to the scope of the present invention. For example, the transmitting control circuit 142 may decide to transmit a signal having one of the voltage levels VL and VH according to the data {BIT1, BIT0} (e.g. the data BIT0) to the selecting circuit 144 with a specific time length, and the selecting circuit 144 then selects to output the signal from the transmitting control circuit 142 (e.g. the signal having one of the voltage levels VL and VH) or the signal from the PWM generator 146. In another example, the transmitting control circuit 142 may transmit both the signal having the voltage level VH and the signal having the voltage level VL to the selecting circuit 144 with the specific time length, respectively, and the selecting circuit 144 then selects one of the signal having the voltage level VH, the signal having the voltage level VL, and the signal from the PWM generator 146 to be output.

Figure 4:
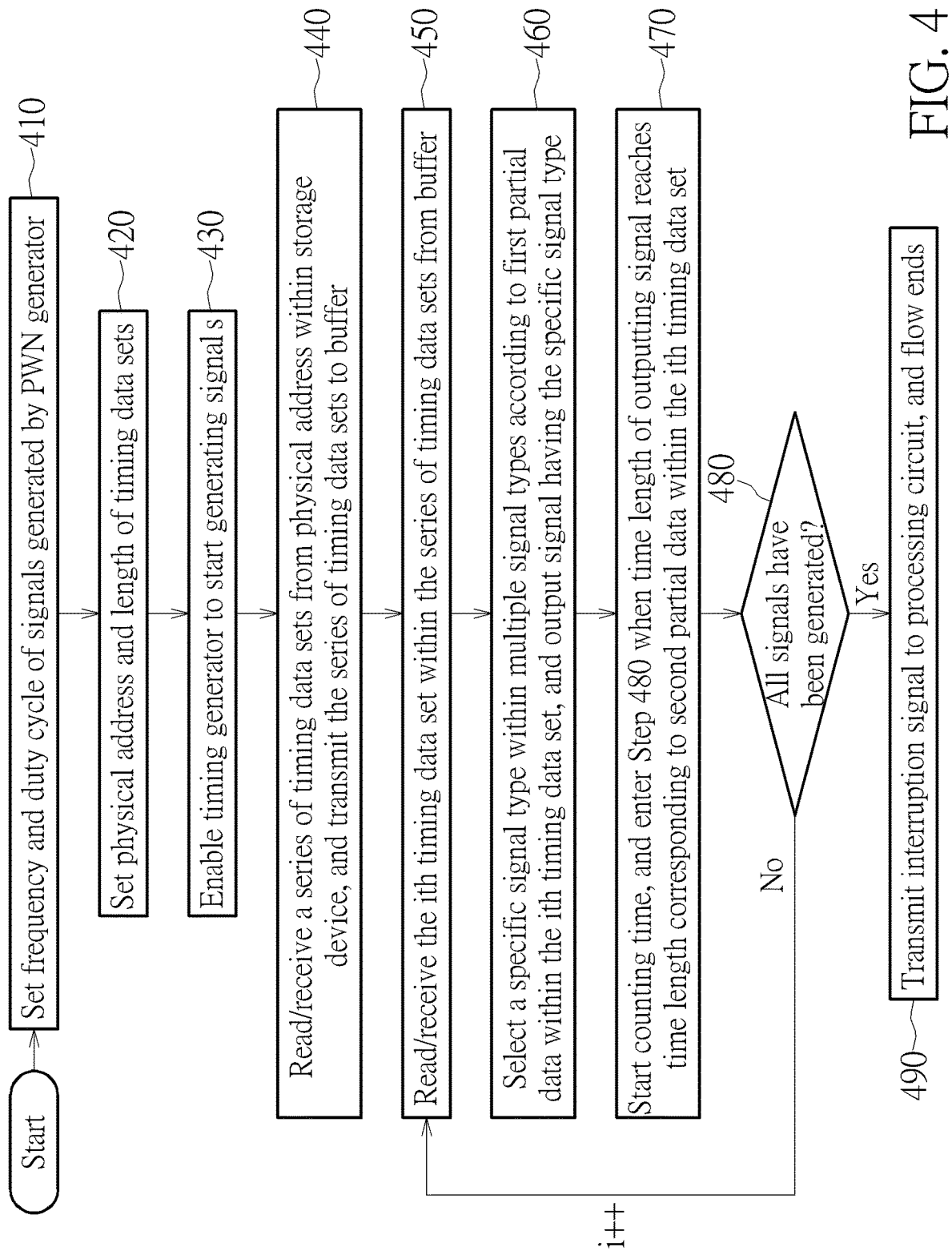
FIG. 4 is a working flow of a timing generating method according to an embodiment of the present invention.

FIG. 4 is a working flow of a timing generating method according to an embodiment of the present invention, where the timing generating method is applicable to the control chip 10 shown in FIG. 1 (or FIG. 3). If the overall working flow can obtain a same or similar result, the order of one or more steps in the working flow may vary, and one or more steps in the working flow may be added, deleted or modified.

In Step 410, the processing circuit 50 sets a frequency and a duty cycle of signals generated by the PWN generator through the control unit 160.

In Step 420, the processing circuit 50 sets a physical address and a length (e.g. a count of timing data sets within a series of timing data sets) of timing data sets through the control unit 160.

In Step 430, the processing circuit 50 enables the timing generator 100 through the control unit 160 to start generating signals.

In Step 440, the receiving circuit 120 reads/receives a series of timing data sets from the physical address (a location of the physical address) within the storage device 20, and transmits the series of timing data sets to the buffer 180, wherein i=1 at this moment.

In Step 450, the transmitting control circuit 142 reads/receives the $i^{th}$ timing data set within the series of timing data sets from the buffer 180, where first partial data and second partial data within the i$^{th}$ timing data set respectively correspond to a signal type and a time length.

In Step 460, the selecting circuit 144 may select a specific signal type within the multiple signal types according to the first partial data within the i$^{th}$ timing data set, and output a signal having the specific signal type. For example, when the value of the data {BIT1, BIT0} shown in FIG. 2 is 0, the selecting circuit 144 outputs the signal having the voltage level VL generated by the transmitting control circuit 142; when the value of the data {BIT1, BIT0} shown in FIG. 2 is 1, the selecting circuit 144 outputs the signal having the voltage level VH generated by the transmitting control circuit 142; and when the value of the data {BIT1, BIT0} shown in FIG. 2 is 2, the selecting circuit 144 outputs the signal generated by the PWM generator 146.

In Step 470, the transmitting control circuit 142 may start counting time through a timer therein, and when a time length of outputting a signal (e.g. the signal having the voltage level VL, the signal having the voltage level VH, or the signal generated by the PWM 146) reaches a time length corresponding to the second partial data within the i$^{th}$ timing data set, Step 480 is entered.

In Step 480, the transmitting control circuit 142 may determine whether all signals have been generated (e.g. whether signals corresponding to all timing data sets within the series of timing data sets have been generated). If yes, Step 490 is entered; otherwise, the value of i is increased by one and Step 450 is entered.

In Step 490, the control unit 160 transmits an interruption signal to the processing circuit 50, and the flow ends.

In the embodiment shown in FIG. 4, as the transmitting control circuit 142 may determine a read time (e.g. a read time point) for a next timing data set according to the second partial data within each timing data set, transmitting a signal having a specific signal type (the signal type corresponding to the first partial data within each timing data set) with a specific time length (the time length corresponding to the second partial data within each timing data set) can be implemented.

Figure 5:
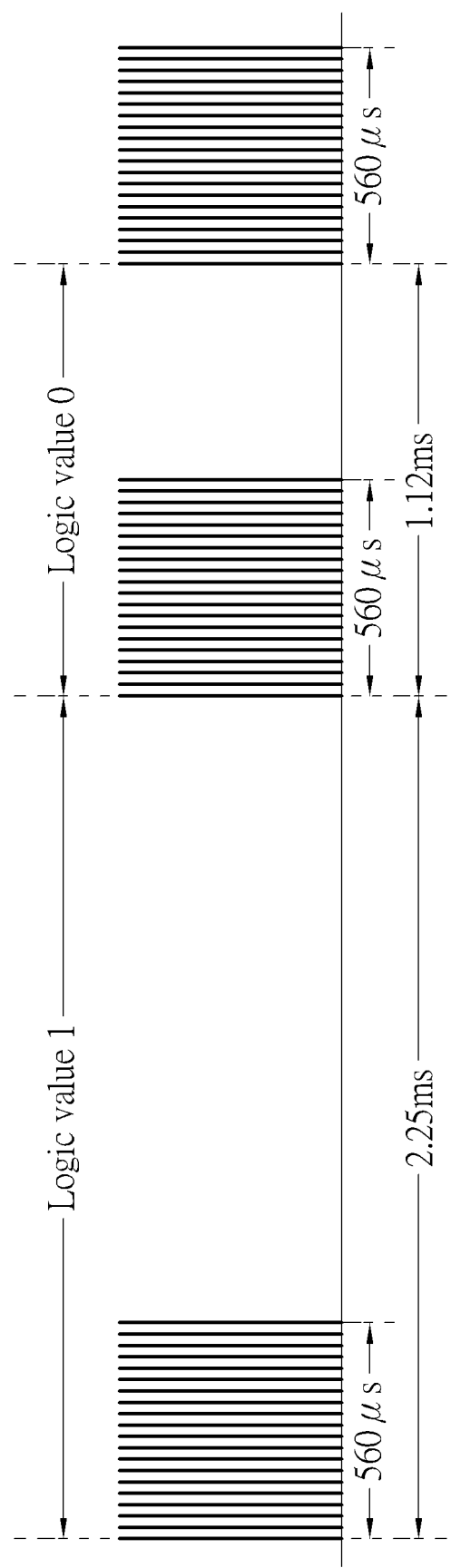
FIG. 5 is a diagram illustrating an output signal generated in response to a series of timing data sets according to an embodiment of the present invention.

In some embodiments, the control chip 10 (e.g. the timing generator therein) shown in FIG. 1 (or FIG. 3) is applicable to an infrared signal transmitter, where a specific time ratio occupied by the specific signal type in a period represents encoded data transmitted by the infrared signal transmitter in the period. For example, in a period, the timing generator 100 may sequentially generate a PWM signal and a signal having a fixed voltage level such as the voltage level VL, and the specific time ratio may be calculated by a ratio between a time length of outputting this PWM signal and a time length of outputting this signal having the voltage level VL. Taking FIG. 5 as an example, the infrared signal transmitter may encode a logic value 1 as a first time ratio occupied by a PWM signal in a period according to a predetermined protocol, e.g. occupying 560 microseconds (µs) in 2.25 milliseconds (ms); or encode a logic value 0 as a second time ratio occupied by a PWM signal in a period according to the predetermined protocol, e.g. occupying 560 µs in 1.12 ms.

To summarize, the present invention utilizes a series of timing data that is able to be arbitrarily edited to respectively generate output signals having different time lengths and different signal types, to accordingly achieve a purpose of generating arbitrary signal waveforms. In addition, in comparison with the related art, the present invention will not greatly occupy computational resources of a CPU. Thus, the present invention can solve the problem of the related art without introducing any side effect or in a way that is less likely to introduce side effects.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A timing generator, comprising:
   a receiving circuit, configured to receive one or more timing data sets from a storage device;
   a transmitting circuit, coupled to the receiving circuit, configured to select a specific signal type within multiple signal types according to a timing data set within the one or more timing data sets, and output an output signal having the specific signal type with a specific time length, wherein the timing data set indicates the specific signal type and the specific time length; and
   a control unit, respectively coupled to the receiving circuit and the transmitting circuit, configured to control operations of the receiving circuit and the transmitting circuit;
   wherein the timing generator is applicable to an infrared signal transmitter, and a specific time ratio occupied by the specific signal type in a period represents encoded data transmitted by the infrared signal transmitter in the period.

2. The timing generator of claim 1, wherein the timing data set comprises first partial data and second partial data, and the first partial data and the second partial data respectively correspond to the specific signal type and the specific time length.

3. The timing generator of claim 1, wherein the multiple signal types at least comprises pulse width modulation (PWM).

4. The timing generator of claim 3, wherein the control unit controls a frequency and a duty cycle of the PWM according to commands transmitted by a processing circuit coupled to the timing generator.

5. The timing generator of claim 1, wherein the multiple signal types at least comprise a first fixed level and a second fixed level different from the first fixed level.

6. The timing generator of claim 1, wherein the transmitting circuit comprises:
   multiple signal sources, configured to generate multiple signals having the multiple signal types, respectively;
   a transmitting control circuit, coupled to the multiple signal sources, configured to output at least one of the multiple signals with the specific time length; and
   a selecting circuit, coupled to the transmitting control circuit, configured to select the specific signal type within the multiple signal types according to the timing data set.

7. The timing generator of claim 1, further comprising a buffer coupled between the receiving circuit and the transmitting circuit, wherein:
   the one or more timing data sets comprise a series of timing data sets, and the series of timing data sets comprises the timing data set; and
   the buffer receives the series of timing data sets from the receiving circuit, and sequentially transmits each timing data set within the series of timing data sets to the transmitting circuit.

8. The timing generator of claim 7, wherein the buffer comprises a first input first output (FIFO) memory.

9. A timing generating method, comprising:
utilizing a receiving circuit to receive one or more timing data sets from a storage device; and
utilizing a transmitting circuit to select a specific signal type within multiple signal types according to a timing data set within the one or more timing data sets, and output an output signal having the specific signal type with a specific time length, wherein the timing data set indicates the specific signal type and the specific time length;
wherein operations of the receiving circuit and the transmitting circuit are controlled by a control unit;
wherein a timing generator comprising the receiving circuit, the transmitting circuit and the control unit is applicable to an infrared signal transmitter, and a specific time ratio occupied by the specific signal type in a period represents encoded data transmitted by the infrared signal transmitter in the period.

10. The timing generating method of claim 9, wherein the timing data set comprises first partial data and second partial data, and the first partial data and the second partial data respectively correspond to the specific signal type and the specific time length.

11. The timing generating method of claim 9, wherein the multiple signal types at least comprises pulse width modulation (PWM).

12. The timing generating method of claim 11, wherein the control unit controls a frequency and a duty cycle of the PWM according to commands transmitted by a processing circuit.

13. The timing generating method of claim 9, wherein the multiple signal types at least comprise a first fixed level and a second fixed level different from the first fixed level.

14. The timing generating method of claim 9, wherein the step of utilizing the transmitting circuit to select the specific signal type within the multiple signal types according to the timing data set and output the output signal having the specific signal type with the specific time length comprises:
utilizing multiple signal sources within the transmitting circuit to generate multiple signals having the multiple signal types, respectively;
utilizing a transmitting control circuit within the transmitting circuit to output at least one of the multiple signals by the specific time length; and
utilizing a selecting circuit within the transmitting circuit to select the specific signal type within the multiple signal types according to the timing data set.

15. The timing generating method of claim 9, wherein the one or more timing data sets comprises a series of timing data sets, the series of timing data sets comprises the timing data set, and the step of utilizing the receiving circuit to receive the one or more timing data sets from the storage device comprises:
utilizing a buffer coupled between the receiving circuit and the transmitting circuit to receive the series of timing data sets from the receiving circuit, and sequentially transmitting each timing data set within the series of timing data sets to the transmitting circuit.

16. The timing generating method of claim 15, wherein the buffer comprises a first input first output (FIFO) memory.

17. A control chip, comprising:
a storage device, configured to store one or more timing data sets;
a timing generator, coupled to the storage device, wherein the timing generator comprises:
a receiving circuit, configured to receive the one or more timing data sets from the storage device;
a transmitting circuit, coupled to the receiving circuit, configured to select a specific signal type within multiple signal types according to a timing data set within the one or more timing data sets, and output an output signal having the specific signal type with a specific time length, wherein the timing data set indicates the specific signal type and the specific time length; and
a control unit, respectively coupled to the receiving circuit and the transmitting circuit, configured to control operations of the receiving circuit and the transmitting circuit; and
a processing circuit, coupled to the timing generator, configured to transmit at least one command to the control unit to control operations of the timing generator;
wherein the control chip is applicable to an infrared signal transmitter, and a specific time ratio occupied by the specific signal type in a period represents encoded data transmitted by the infrared signal transmitter in the period.

* * * * *